Aug. 2, 1960    M. WAYNE    2,947,391
CORNER CONNECTION FOR FRAMES
Filed March 19, 1958
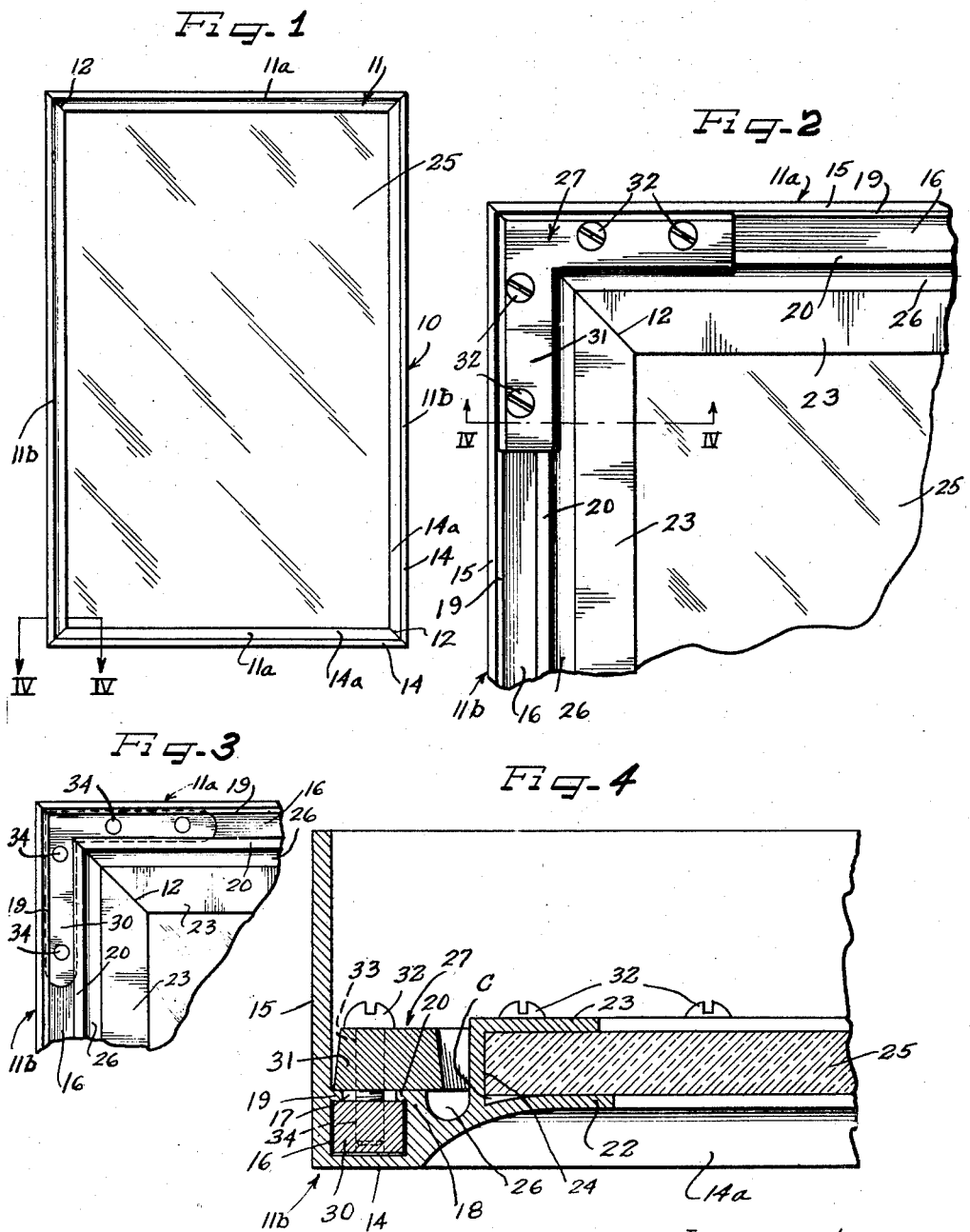
Inventor
Michael Wayne
by Hill, Sherman, Meroni, Gross & Simpson    Attys

United States Patent Office 2,947,391
Patented Aug. 2, 1960

2,947,391

CORNER CONNECTION FOR FRAMES

Michael Wayne, Chicago, Ill., assignor to The Tablet & Ticket Company, Chicago, Ill., a corporation of Illinois Filed Mar. 19, 1958, Ser. No. 722,610

2 Claims. (Cl. 189—76)

This invention relates to frames, especially useful for directory panels and the like, which are free from visible fasteners and are readily disassembled to accommodate replacement of a glass panel or other framed member.

More particularly, this invention relates to clamp means for interconnecting frame end and side members to provide an attractive frame free from visible corner connections.

Extruded metal strips have been utilized in constructing frames for receiving glass panels or other articles to be framed. Display panels such as directory guides and the like, are constructed with extruded metal strip frames of a strong, rugged nature and these frames carry glass panes to cover the directory information. To provide attractive extruded metal frames for such directory panels, it has been necessary to connect the frame strips to provide attractive mitered corners free from visible connection means. Heretofore known corner connections which were invisible from the front of the frame, had to be of a permanent nature which would not accommodate disassembly of the frame sides and ends. These known connectors were made from soft alloys providing corner braces which could be peened into locked relation with the frame strips. Once the frame was assembled around the glass panel, however, in such devices, it was impossible to replace the glass or a damaged frame portion because the extruded strips were permanently united.

The present invention now provides removable clamp-type connectors for securing frame strips to provide an attractive, mitered joint appearance at the corner of a frame without displaying the connector unit. The connector clamps of this invention also provide rigidifying braces for the frame. The clamp devices include a pair of metal angle members, including a first member for seating in channels of the extruded frame strips and a second member for overlying these channels. Screws draw the first and second members together to clamp the frame strips therebetween. The resulting assembly thus includes rigid angle braces at each corner of the frame.

It is, then, an object of this invention to provide a connector, not visible from the front of the frame, to rigidly but removably interconnect the end and slide strip members of a frame.

A further object of this invention is to provide clamp-type rigid connectors for detachably uniting extruded metal frame strips to provide corner connections and hold the strips together for presenting a mitered joint appearance at each corner of the frame.

A still further object of this invention is to provide a corner brace and connector for extruded metal frame members having panel receiving channels, which connectors provide rigidity to the frame structure at the junction of the individual frame strips where the most stress occurs, will not be visible from the front of the frame, and will accommodate disassembly of the frame members for replacement of a panel in the channels thereof.

A still further object of this invention is to provide an angle clamp for interconnecting frame members.

Other and further objects of this invention will be apparent to those skilled in the art from the following detailed description of the annexed sheet of drawings which, by way of preferred embodiment only, illustrates constructional details of this invention.

On the drawings:

Figure 1 is a front view of a glass equipped frame, for a directory panel or the like, and embodying the principles of the present invention;

Figure 2 is an enlarged, fragmentary rear view of the frame of Figure 1, showing the corner connector and brace of the present invention;

Figure 3 is a view similar to Figure 2 but with a portion of the connector removed to show the underlying angle piece;

Figure 4 is an enlarged, tranverse cross-sectional view taken along the line IV—IV of Figures 1 and 2.

As shown on the drawings:

The directory panel or other display device 10 of Figure 1 has a rectangular frame 11 composed of four extruded aluminum frame strips, including end frame strips 11a and side frame strips 11b with mitered together ends 12 providing attractive right-angle corners for the frame free from any visible connectors or attachment means. The frame has an attractive appearance of solidarity and smoothness.

Each frame strip 11a and 11b, such as the strip 11b of Figure 4, has a flat front face 14 with an inwardly beveled inner marginal portion 14a and a flat side face 15 at right angles to the face 14 and extending rearwardly therefrom for a substantial distance. A generally rectangular channel or groove 16 is provided in each strip along the length thereof immediately behind the front face 14 thereof. The channel has a slotted opening 17 exposed to the rear of the strip and bounded by opposed ribs 19 and 20 respectively projecting from the side wall 15 and an upstanding body portion 18 of the frame strip. These ribs 19 and 20 provide opposed flat clamping or abutment walls or shoulders respectively facing the inside of the channel 16 and extending flatwise from each side of the opening 17.

The inwardly beveled marginal portion 14a of the front wall of each frame strip is provided with a rectangular channel C opening inwardly and bounded by a front edge 22, the front face of which is beveled to provide a part of the margin 14a, a rear edge or wall 23 parallel to the edge 22 and an upstanding bottom wall 24 extending rearwardly from the margin portion 14a. This channel C opens at the inside edge of the stop to snugly receive the peripheral margin of a pane of glass 25.

A round bottom groove or flute 26 is provided between the body portion 18 and the bottom wall 24 of the channel C, and the marginal portion 14a is extended to provide space for this groove in order to accommodate directory panel material which might be mounted within the side wall of the frame behind the glass pane 25. Mounting means or the like for holding the material behind the glass pane within the confines of the frame will not be visible and can be positioned behind the front wall of each strip.

As shown, the ends of the strips 11a and 11b are cut at a 45° angle to provide the mitered joints 12.

According to this invention, the ends of the strips are secured together and the corners of the frame 10 are rigidified by a clamp assembly 27 at each corner of the frame. Each clamp assembly 27 includes a metal angle bar 30 having the legs thereof fitting in the channels 16 of adjoining frame strips 11a and 11b. The legs of the angle bar 30 are wider than the openings 17 of the channels so that the angle brace will be retained in the channel by the overlying lips 19 and 20. Each leg of the angle bar is adapted to be slid into a channel 16 from the end of the strip containing the channel, and when the strips are drawn together to provide the mitered corner 12, the angle bar will have its corner aligned with the mitered corner of the frame as shown in Figure 3.

The clamp assembly 27 of this invention includes an overlying angle bar 31 fitting in the space between the side wall 15 and the grooved bottom wall 24 of each frame strip. This angle bar 31 is more massive than the bar 30 and each leg thereof spans the channel opening 17 to seat on the ribs 19 and 20 over the channel.

Two screws 32 extend freely through holes 33 in each leg of the clamping bar 31. The legs of the underlying angle bar 30 each have two tapped screw holes 34 for receiving the screws 32 in threaded relation.

When the screws 32 are tightened to draw their heads against the clamping bar 31, the bars 30 and 31 are drawn together to grip the opposite faces of the ribs 19 and 20 thereby clamping the assembly to the adjoining frame strips 11a and 11b and rigidly holding the strips in alignment and in connected relation.

To assemble the frames of this invention, it is only necessary to slide the angle bars 30 into the ends of one pair of strips such as the strips 11b, with the unseated legs of the bars extending from the corners of the strips at right angles to the strips. The other pair of strips is then brought into position to receive the extending legs of the bars. Before pulling the strips together to form the mitered corners, the glass panel 25 is seated in the channel C. When the strips are then drawn together to place their inclined edges in abutment and form the mitered corners 12, the angle bars 30 hold the strips in alignment and it is then only necessary to secure the angle bars in position by placing the clamping angle bars 31 thereover and by tightening the screws 32. Whenever the glass pane is broken, or whenever the frame strip is damaged, the broken or damaged part can be easily and quickly replaced by mere loosening of the clamping attachments 27 of this invention.

It will therefore be understood from this description that the invention provides easily assembled frames, capable of being readily disassembled to accommodate replacement of framed parts or damaged frame sections and without having any exposed frame strip securing means. It will also be understood that this invention provides clamp-type connectors for securing frame strips and for strengthening and rigidifying the corners of frames.

I claim as my invention:

1. A frame for display devices and the like comprising end and side frame strips each having a flat front marginal wall and an inwardly beveled wall extending from the inner end of the marginal wall to define a frame opening, said strips also having a side wall extending rearwardly from the periphery of the front marginal wall for a considerable distance, the beveled front wall portion of each strip having an inwardly opening channel adapted to receive the marginal edge of a panel, each strip also having a rearwardly opening channel between the panel receiving channel and the rearwardly extending side wall, said rearwardly opening channel being spaced outwardly from the panel channel immediately behind the flat marginal front wall portion, the space between the two channels having a rearwardly opening groove, the rearwardly opening channel of each strip having overlying top ribs providing opposed flat abutment faces, clamping connectors uniting the side and end strips, each of said connectors including an angle bar seated in a channel of adjacent strips and an overlying massive angle clamping bar seated on the top ribs of the rearwardly opening channel of adjacent strips, said massive angle clamping bar being larger and more rigid than the underlying angle bar seated in the channels, screw means connecting the clamping bar and angle bar to draw the bars against opposed faces of the ribs and to hold the strips in aligned secured together relation, and said side wall of the strips extending rearwardly beyond the clamping bars for a considerable distance and adapted to confine material mounted behind said front wall and in said rearwardly opening groove.

2. A rectangular frame comprising four extruded metal frame strips of generally L-shaped cross-section and including a pair of opposed side strips and a pair of opposed end strips, each of said strips having inclined ends abutted together and providing a miter joint appearance at the corners of the frame, each of said frame strips having inwardly opening channels for receiving a glass panel or the like to be framed, said strips having rearwardly extending walls at the bottoms of the inwardly opening channels, each of said strips having a longitudinal rearwardly opening channel between the rearwardly extending walls of the inwardly opening channels and the outer sides thereof and spaced outwardly from said rearwardly extending wall to provide a material receiving space within the confines of the strips, each of said rearwardly opening channels having inwardly extending top ribs providing opposed abutment faces, a detachable connector at each corner of the frame, each connector including an angle bar having the legs thereof extending into the channels of adjacent strips and an overlying massive clamping bar larger than the angle bar seated on top of the ribs together with screw means fitting freely through the clamping bar and threaded into the angle bar for drawing the clamping bar and angle bar toward each other against the opposed faces of the ribs to thereby securely connect the strips in assembled frame relation while rigidifying the corners of the frame, and each of said strips having rearwardly extending side walls at the periphery thereof terminating materially beyond the massive clamping bars for confining material positioned behind a glass panel or the like carried in the inwardly opening channels of the strips.

References Cited in the file of this patent

UNITED STATES PATENTS

| | | |
|---|---|---|
| 1,285,973 | Fredman | Nov. 26, 1918 |
| 2,654,451 | Schmidgall | Oct. 6, 1953 |
| 2,666,508 | Nardulli | Jan. 19, 1954 |